United States Patent
Wang et al.

(10) Patent No.: US 8,155,053 B2
(45) Date of Patent: Apr. 10, 2012

(54) METHOD AND APPARATUS FOR DATA SECURITY AND AUTOMATIC REPEAT REQUEST IMPLEMENTATION IN A WIRELESS COMMUNICATION SYSTEM

(75) Inventors: Peter Shaomin Wang, E. Setauket, NY (US); Stephen E. Terry, Northport, NY (US); Ulises Olvera-Hernandez, Kirkland (CA)

(73) Assignee: InterDigital Technology Corporation, Wilmington, DE (US)

(*) Notice: Subject to any disclaimer, the term of this patent is extended or adjusted under 35 U.S.C. 154(b) by 767 days.

(21) Appl. No.: 11/612,139

(22) Filed: Dec. 18, 2006

(65) Prior Publication Data
US 2007/0171857 A1  Jul. 26, 2007

Related U.S. Application Data

(60) Provisional application No. 60/796,161, filed on Apr. 29, 2006, provisional application No. 60/753,077, filed on Dec. 22, 2005.

(51) Int. Cl.
*H04W 4/00* (2009.01)
(52) U.S. Cl. ........ 370/328; 370/329; 370/466; 370/503; 455/410; 455/411; 455/422.1; 455/403
(58) Field of Classification Search .......... 370/328, 370/329, 466, 503, 315, 392; 455/410, 411, 455/452, 403, 422.1
See application file for complete search history.

(56) References Cited

U.S. PATENT DOCUMENTS

| | | | |
|---|---|---|---|
| 2003/0091048 A1* | 5/2003 | Jiang | 370/392 |
| 2003/0157927 A1* | 8/2003 | Yi et al. | 455/411 |

OTHER PUBLICATIONS

R2-052897; Qualcomm proposal for E-UTRAN architecture and protocols, dated Nov. 8-11 In 3GPP TSG-RAN2 Meeting # 49.*
R2-052918; Siemens agenda item 5, dated Nov. 7-11, 2005 in 3GPP TSG-RAN2 Meeting # 49.*
Seurre et al. (2003) GPRS in Mobile Internet (pp. 356,358).*

* cited by examiner

*Primary Examiner* — Kamran Afshar
*Assistant Examiner* — Manpreet Matharu
(74) *Attorney, Agent, or Firm* — Volpe and Koenig, P.C.

(57) ABSTRACT

A method and apparatus for implementing data security and automatic repeat request (ARQ) in a wireless communication system are disclosed. Cipher entities are included in a wireless transmit/receive unit (WTRU) and an access gateway (aGW), and outer ARQ, (or radio link control (RLC)), entities are included in the WTRU and an evolved Node-B (eNode-B). Each cipher entity is located on top of an outer ARQ entity. The cipher entities cipher and decipher a data block by using a generic sequence number (SN) assigned to the data block. The outer ARQ entities may segment the ciphered data block to multiple packet data units (PDUs), may concatenate multiple ciphered data blocks to a PDU, or may generate one PDU from one data block. The outer ARQ entities may segment or re-segment the PDU when a transmission failure occurs.

42 Claims, 4 Drawing Sheets

METHOD AND APPARATUS FOR DATA SECURITY AND AUTOMATIC REPEAT REQUEST IMPLEMENTATION IN A WIRELESS COMMUNICATION SYSTEM

CROSS REFERENCE TO RELATED APPLICATIONS

This application claims the benefit of U.S. provisional application Nos. 60/753,077 filed Dec. 22, 2005 and 60/796,161 filed Apr. 29, 2006, which are incorporated by reference as if fully set forth.

FIELD OF INVENTION

The present invention is related to wireless communication systems. More particularly, the present invention is related to a method and apparatus for data security and automatic repeat request (ARQ) implementation in a wireless communication system.

BACKGROUND

The third generation partnership project (3GPP) has initiated a long term evolution (LTE) project to bring new technology, new network architecture and configuration, and new applications and services to a wireless cellular network in order to provide improved spectral efficiency, reduced latency, faster user experiences, and richer applications and services with less cost.

In the wireless communication network, user data privacy and user data accuracy are always the main concerns. The data privacy and accuracy concerns are addressed by data block encryption, (i.e., ciphering for both user data and control messages), and implementation of ARQ protocol on the data path to recover lost or inaccurate data.

Figure 1:
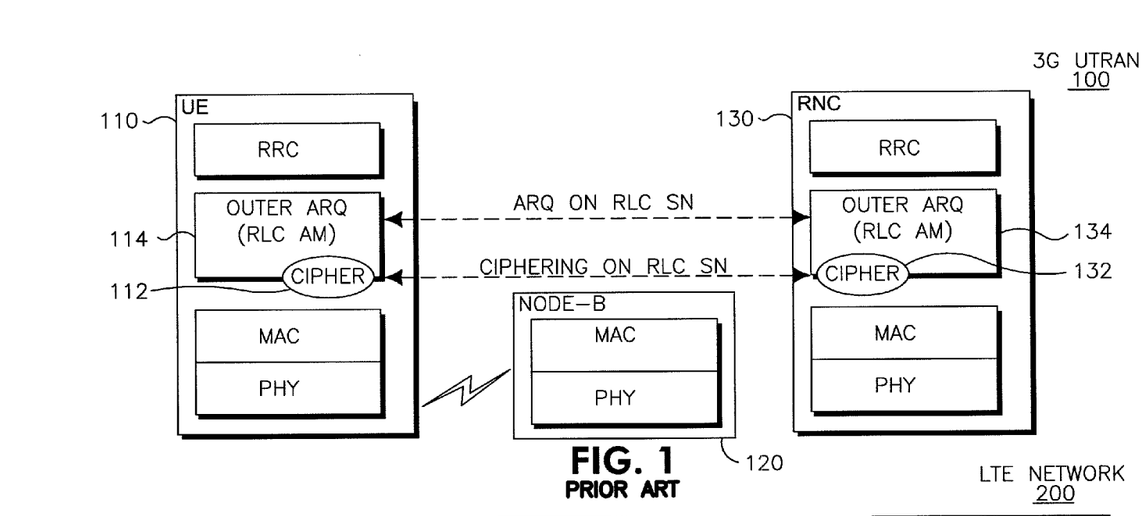
FIG. 1 shows a conventional 3G UTRAN.

FIG. 1 shows a conventional third generation (3G) universal terrestrial radio access network (UTRAN) 100. The UTRAN 100 includes a user equipment (UE) 110, a Node-B 120 and a radio network controller (RNC) 130. In the UTRAN 100, security procedural entities 112, 132, (i.e., cipher entities), are located in the UE 110 and the RNC 130, along with outer ARQ entities 114, 134, (i.e., radio link control (RLC) acknowledged mode (AM) entities). Both the cipher entities 112, 132 and the outer ARQ entities 114, 134 use RLC protocol packet data unit (PDU) sequence numbers (SNs) as an input for the data block encryption/decryption and for ARQ operation.

In LTE, the architecture of the UTRAN 100 will be changed. The RNC 130 no longer exists. An evolved Node-B (eNode-B) will assume medium access control (MAC) and some radio resource control (RRC) functionalities. Original RLC sub-layer and the data security, (or ciphering), entity in the RNC 130 will have to be re-located in LTE to maintain the necessary data encryption and data ARQ functionalities. Given this new LTE network architecture, the issue is where the outer ARQ entities and the data security entities shall be located and how the two formerly co-located entities cooperate to work in the LTE system.

Figure 2:
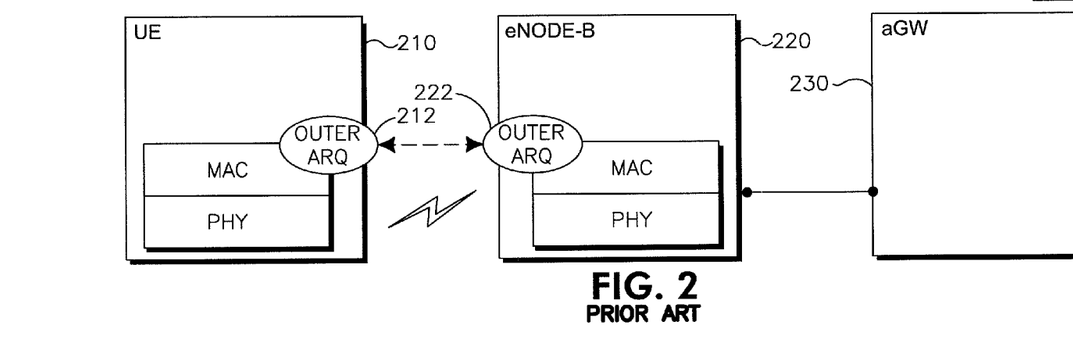
FIG. 2 shows a proposed LTE network architecture with respect to outer ARQ entities.

FIG. 2 shows a proposed LTE network 200 with respect to outer ARQ entities. The LTE network 200 includes a UE 210, an eNode-B 220 and an access gateway (aGW) 230. In the proposed LTE network 200, outer ARQ entities 212 and 222 are located in the UE 210 and the eNode-B 220, respectively. Placing the outer ARQ entity 222 in the eNode-B 220 would be optimal with respect to retransmission delay, retransmission PDU size, simple protocol complexity, low buffering requirements and possible hybrid ARQ (H-ARQ) and outer ARQ interaction. However, this approach does not have a user data security process in mind.

It would be optimal to place user data security entities in the UE 210 and the aGW 230, which is a network anchor node, for the following reasons. First, the security parameters of the UE 210 (or user), (such as UE security credentials, encryption key sets, or the like), may be kept in a safer place, (i.e., aGW 230), where the interaction of UE authentication with a home subscriber server (HSS) is administered. Second, user data may be protected all the way from the aGW 230 to the UE 210 without requiring an additional scheme to achieve at least the same level of security as in the conventional UTRAN 100. Third, eNode-B physical protection may be simplified, thus increasing the total system security protection and the system cost effectiveness, and simplifying the eNodeB functionality. Forth, inter-Node-B handover and inter-aGW handover would be easier from less security context transfer, (between eNode-Bs if the data security entity is located on an eNode-B). However, the drawback on this approach is that the outer ARQ is not taken into consideration.

Simply putting the data security entities in the eNode-B 220 or putting outer ARQ entities in the aGW 230 will not meet LTE security requirements and data retransmission performance requirements. Therefore, it would be desirable to provide an architecture and operational scheme which provides the best possible performances with respect to the data security functionality and the outer ARQ functionality for the new LTE network architecture.

SUMMARY

The present invention is related to a method and apparatus for implementing data security and ARQ in a wireless communication system. Cipher entities are included in a wireless transmit/receive unit (WTRU) and an aGW, and outer ARQ, (or RLC), entities are included in the WTRU and an eNode-B. Each cipher entity is located on top of an outer ARQ entity. The cipher entities cipher and decipher a data block by using a generic SN assigned to the data block. The outer ARQ entities may segment the ciphered data block to multiple PDUs, may concatenate multiple ciphered data blocks to a PDU, or may generate one PDU from one data block. The outer ARQ entities may segment or re-segment the PDU when a transmission failure occurs.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a personal data assistant (PDA), a cellular telephone, a computer, or any other type of user device capable of operating in a wireless environment. When referred to hereafter, the terminology "eNode-B" includes but is not limited to a base station, a Node-B, a site controller, an access point (AP) or any other type of interfacing device in a wireless environment.

The features of the present invention may be incorporated into an integrated circuit (IC) or be configured in a circuit comprising a multitude of interconnecting components.

Figure 3:
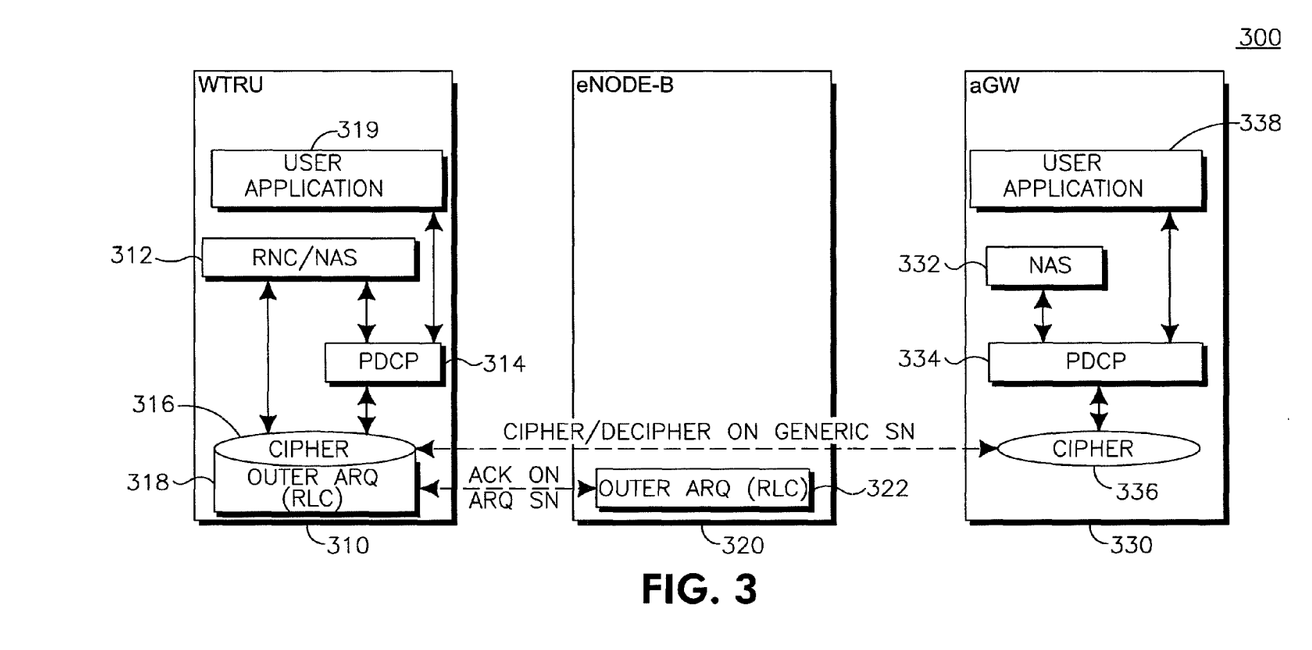
FIG. 3 shows a wireless communication system configured in accordance with the present invention.

FIG. 3 shows a wireless communication system 300 configured in accordance with the present invention. The system 300 includes a WTRU 310, an eNode-B 320 and an aGW 330. The WTRU 310 includes an RRC/non-access stratum (NAS) entity 312, a packet data convergence protocol (PDCP) entity 314, a cipher entity 316, an outer ARQ, (or RLC), entity 318 and a user application layer 319. The eNode-B 320 includes an outer ARQ entity 322. The aGW 330, (may also be referred to as an evolved global packet radio services (GPRS) service node (eGSN)), includes an NAS entity 332, a PDCP entity 334, a cipher entity 336 and a user application layer 338.

In accordance with the present invention, cipher entities 316 and 336 reside in the WTRU 310 and the aGW 330, respectively, and outer ARQ entities 318 and 322 reside in the WTRU 310 and the eNode-B 320, respectively. The order of ciphering operation and the outer ARQ operation is changed from the conventional system such that data block ciphering is performed before data block segmentation or concatenation by the outer ARQ entities 318 and 322. This means that the cipher entities 316 and 336 are located on top of the outer ARQ entities 318 and 322. The cipher entities 316 and 336 may be directly invoked by the RRC/NAS entity 312 and the NAS entity 332, respectively, on a control plane (C-plane) through the PDCP entities 314 and 334, or by the PDCP entities 314, 334, (under the user application layers 319, 338), on a user plane (U-plane).

The cipher entities 316, 336 perform data security functionality by encrypting and decrypting a data block, (i.e., control message from the RRC/NAS entity 312 or the NAS entity 332 through the PDCP entity 314, 334 or a user service data unit (SDU) from the PDCP entity 314, 334). The cipher entities 316, 336 use a generic SN for data encryption and decryption. The generic SN is a sequence number used for ciphering and deciphering the data block. The generic SN for each data block is preferably used together with other ciphering parameters, (such as a ciphering key, bearer-ID, etc.), to encrypt and decrypt the data block.

Figure 4:
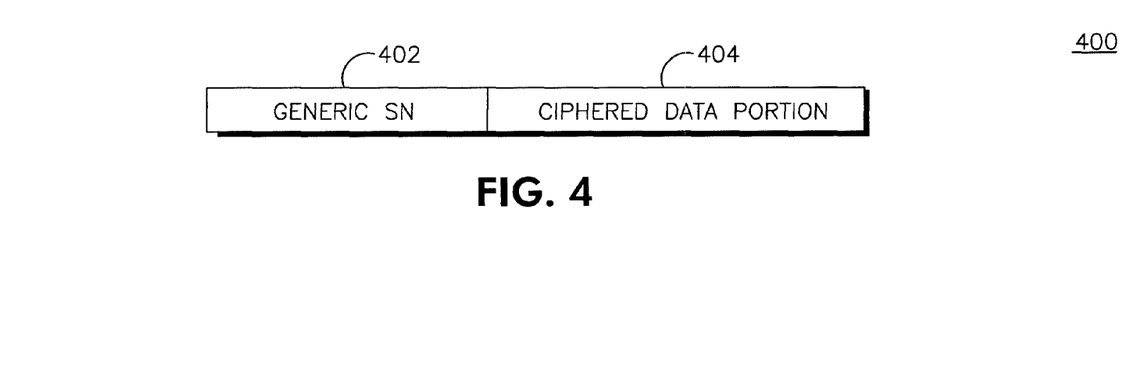
FIG. 4 shows a ciphered data block configured in accordance with the present invention.

FIG. 4 shows a ciphered data block 400 configured in accordance with the present invention. The ciphered data block 400 includes a generic SN 402 and a ciphered data portion 404. A data block is ciphered by the cipher entity 316, 336 using a generic SN 402. The generic SN 402 is left unencrypted.

The generic SN 402 may be allocated by a higher layer entity, (such as the NAS entity 312, 332 or the PDCP entity 314, 334). Alternatively, the generic SN 402 may be derived by the cipher entity 316, 336 with a seed, such as a required transmission sequence numbers known at the WTRU 310 and the aGW 330, (e.g., a PDCP SN for U-plane data, an RRC message SN or a NAS message SN for C-plane data). The advantage of this scheme is that the generic SN 402 may be used for multiple H-ARQ and/or outer ARQ transmissions, which results in reducing signaling overhead.

The outer ARQ entity 318, 322 generates a PDU from the ciphered data block 400 and performs ARQ operation. The outer ARQ entity 318, 322 may segment the ciphered data block 400 into a number of outer ARQ PDUs. When a ciphered data block size exceeds a PDU size, the ciphered data block 400 is segmented into multiple blocks. The outer ARQ entity 318, 322 may assign an ARQ SN for each of the PDUs. The ARQ SN is a sequence number used for transmission feedback, (i.e., a positive acknowledgement (ACK) or a negative acknowledgement (NACK)), and retransmission of failed PDUs between two outer ARQ entities 318, 322.

Figure 5A:
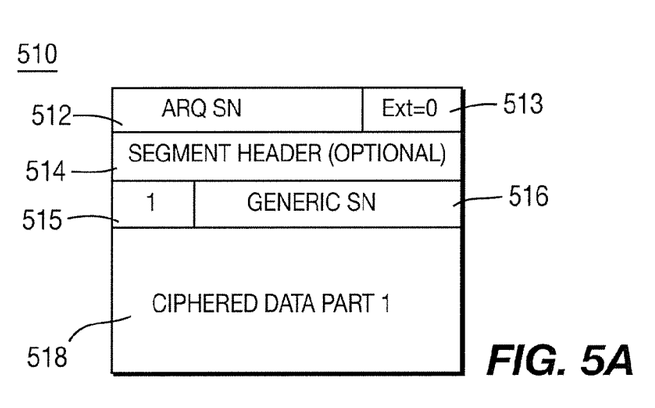
FIGS. 5A and 5B show two exemplary segmented PDUs in accordance with the present invention.
Figure 5B:
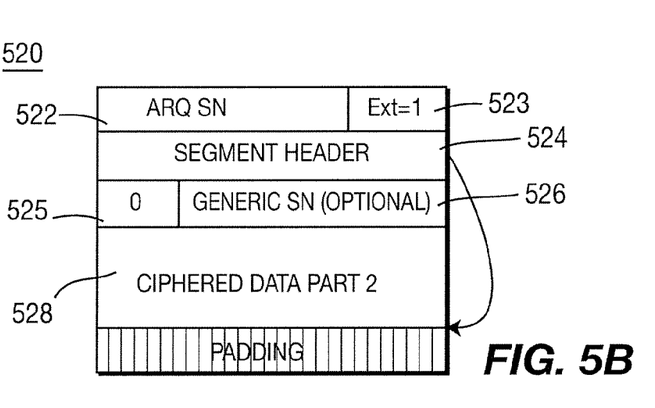

FIGS. 5A and 5B show two exemplary segmented PDUs 510, 520 in accordance with the present invention. In this example, a ciphered data block is segmented into two ciphered data parts 518, 528 which are included in two PDUs 510, 520, respectively. The generic SN 516 may be included only in the first PDU 510 and the generic SN 526 may be omitted in the subsequent PDUs 520 to avoid repeated transmission of the generic SN. An SN field 515, 525 is a 1-bit indicator field in preceding the generic SN 516, 526 to indicate whether a generic SN 516, 526 is following or not. The extension field 513, 523 after the ARQ SN 512, 522 indicates whether a segment header 514, 524 is following or not. The segment header 514, 524 comprises a length indicator (LI) and a segment extension indicator (SE). The LI indicates the last position of the ciphered data part in the PDU, as shown in FIG. 5B. The SE indicates whether another segment header is following or not. The segment header 514, 524 is optional and may be omitted when there is no padding, as shown in FIG. 5A, or the ciphered data block has a fixed size.

Alternatively, the outer ARQ entity 318, 322 may concatenate several data blocks into one PDU. When a ciphered data block size is smaller than a PDU size, multiple ciphered data blocks may be concatenated in one PDU.

Figure 6:
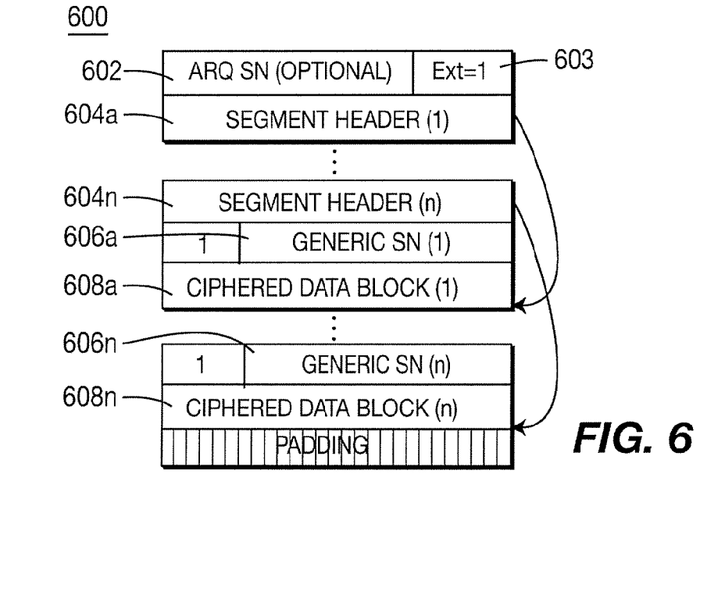
FIG. 6 shows an exemplary concatenated PDU in accordance with the present invention.

FIG. 6 shows an exemplary concatenated PDU 600 in accordance with the present invention. An optional ARQ SN 602 may be assigned by the outer ARQ entity 318, 322 to the PDU 600. The concatenated PDU 600 is generated from multiple ciphered data blocks and includes multiple segment headers 604a-604n. Each segment header 604a-604n indicates the ending position of the corresponding ciphered data blocks 608a-608n in the PDU 600. A different generic SN is used for each of the data blocks and the generic SNs 606a-606n are included in the PDU 600. The extension field 603 after the ARQ SN 602 indicates whether a segment header 604a is following or not. If the concatenation always supports in-sequence concatenated SDUs, the generic sequence number may only be included in the first concatenated SDU.

Alternatively, the outer ARQ entity 318, 322 may generate one PDU from one ciphered data block, (i.e., one-to-one mapping). When the ciphered data block size is close or same to the PDU size, the outer ARQ entity 318, 322 may generate one PDU from one data block. The one-to-one mapping may occur by coincidence or by configuration. If the one-to-one mapping is configured, the generic SN used by the cipher entity 316, 336 may include an ARQ SN, (either in higher or lower order bit positions in the generic SN). In this case, the generic SN is called a common SN. The common SN is a sequence number as a generic SN, but it embeds an ARQ SN. The common SN may be used when by configuration one data block is carried by one PDU. Since the ARQ SN is embedded in the common SN, the outer ARQ entity does not need to allocate another ARQ SN and a processing overhead is reduced.

Figure 7:
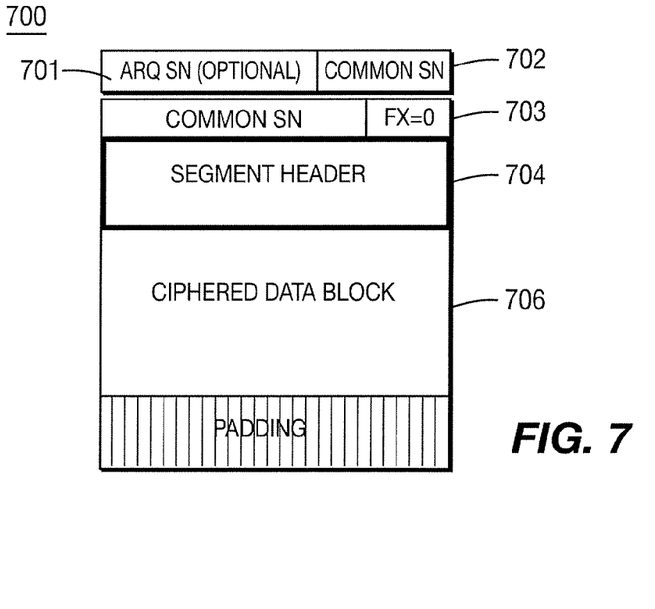
FIG. 7 shows an exemplary PDU generated by one-to-one mapping in accordance with the present invention.

FIG. 7 shows an exemplary PDU 700 generated by one-to-one mapping. The PDU 700 includes a common SN 702 which embeds an ARQ SN 701. The segment header 704 indicates the last position of the ciphered data block 706. The data block size may be fixed, (by configuration), or may be flexible. The segment header 704 may be omitted if padding is zero or the size of the data block is fixed. An FX field 703 is a 1-bit indicator field following the common SN 702, indicating whether a segment header 704 is following or not.

A receiving side outer ARQ entity checks the ARQ SN for ACK or NACK. The transmission status feedback flows between the WTRU 310 and the eNode-B 320 to ensure the guaranteed data service at the shortest possible time. All correctly received PDUs are then passed to a reassembly process to form the original ciphered data block, each associated with a unique ciphering sequence number. The generic SN, (or common SN), is used for data deciphering by the cipher entity 314, 334.

Figure 8:
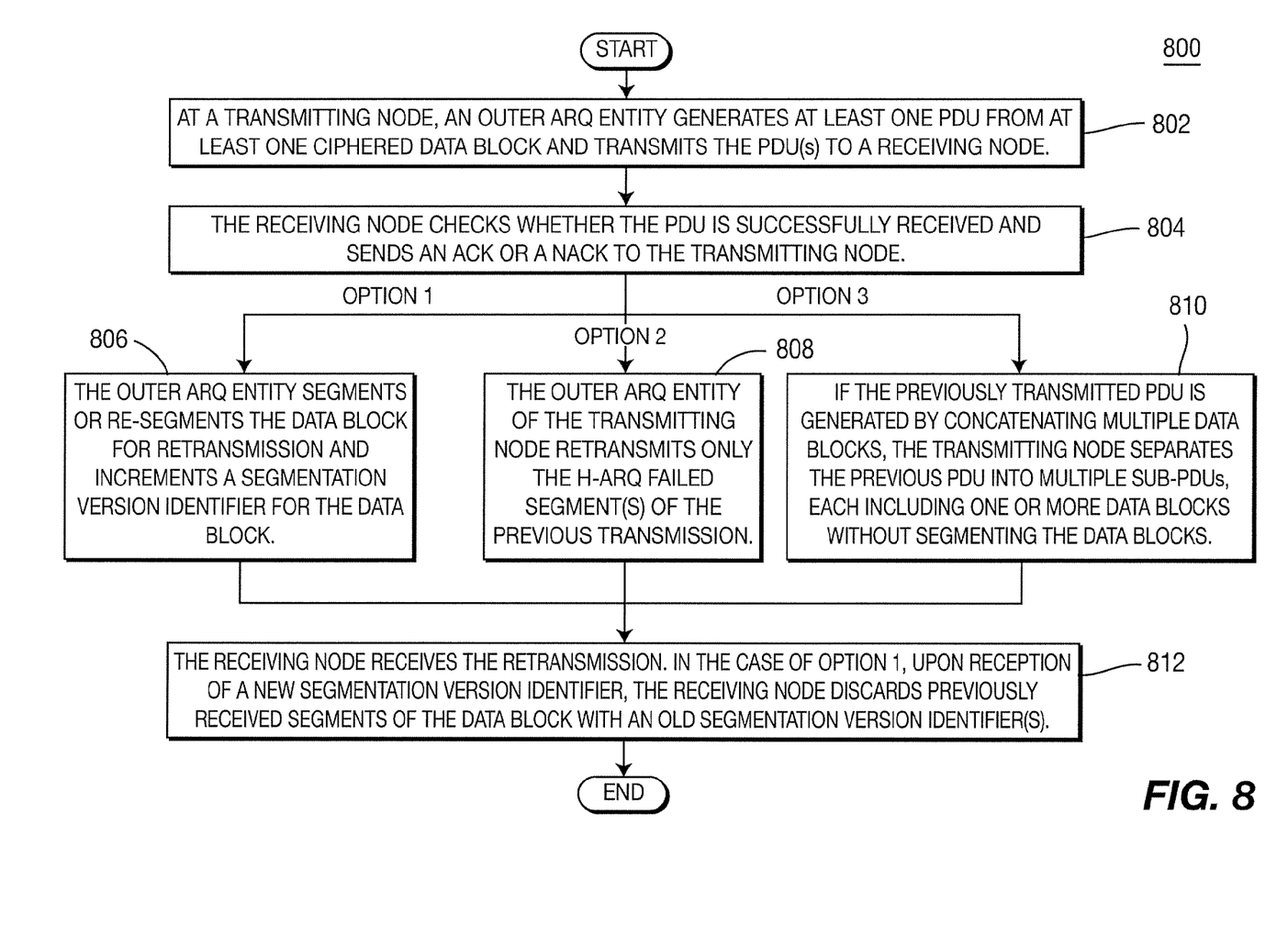
FIG. 8 is a flow diagram of a process for segmentation and re-segmentation operation between a WTRU and an eNode-B in accordance with the present invention.

FIG. 8 is a flow diagram of a process 800 for segmentation and re-segmentation operation between a WTRU 310 and an eNode-B 320 of the wireless communication system 300 of FIG. 3 in accordance with the present invention. The WTRU 310 and the eNode-B 320 implement an H-ARQ for transmission of a PDU. At a transmitting node, (either the WTRU 310 or the eNode-B 320), an outer ARQ entity 318, 322 generates at least one PDU from at least one ciphered data block and transmits the PDU(s) to a receiving node (step 802). The PDU(s) may be generated by segmenting one data block, by concatenating multiple data blocks, or may be generated from one data block by one-to-one mapping. The receiving node checks whether the PDU is successfully received and sends an ACK or a NACK to the transmitting node (step 804).

Upon receiving feedback indicating H-ARQ transmission failure, (including H-ARQ retransmissions), of one or more segments, the transmitting node may resend the data block. The data block may be retransmitted as long as retransmission criteria is met, (i.e., maximum delay or latency, or maximum number of retransmissions is not exceeded). The assigned physical resources, channel quality and/or available transmission power may result in a different allowable transport format combination (TFC) subset requiring different segment sizes for retransmitting the data block.

In resending the data block, the transmitting node has three options. The outer ARQ entity 318, 322 may segment or re-segment the data block or PDU for retransmission and increments a segmentation version identifier for this data block identified by the generic SN (step 806). If the data block was not segmented previously, (i.e., the data block was generated by one-to-one mapping), the outer ARQ entity 318, 322 may segment the data block for retransmission. If the data block was segmented previously, the outer ARQ entity 318, 322 may re-segment the data block or PDU to different segment sizes and potentially different number of segments. Upon reception of a new segmentation version identifier, in the case of data block re-segmentation, the receiving node discards previously received segments of the data block or PDU with an old segmentation version identifier(s) (step 812). Optionally, in the case of data block re-segmentation, upon performing re-segmentation and setting a new segmentation version identifier, the transmitting node may terminate H-ARQ process for the old segments.

Alternatively, the outer ARQ entity 318, 322 of the transmitting node may choose not to re-segment the data block, but retransmit only the H-ARQ failed segment(s) of the previous transmission (step 808). In this case, the segmentation version identifier is not incremented so that the receiving node does not discard successfully received segments of the previous transmission of the data block or PDU.

If the previously transmitted PDU is generated by concatenating multiple data blocks, depending on assigned physical resources, channel quality, and/or available transmission power, the transmitting node may separate the previous PDU into multiple sub-PDUs, each including one or more data blocks without segmenting the data blocks (step 810). Since the data blocks are not segmented and the receiving node can unambiguously determine lost and duplicate data block from the generic SN, it is not necessary to coordinate transmissions between the transmitting node and the receiving node with a segmentation version identifier.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, implemented by a wireless transmit/receive unit (WTRU) for implementing data security and automatic repeat request (ARQ), the method comprising:
    assigning a generic sequence number (SN) to a data block in a layer above a radio link control (RLC) layer;
    ciphering the data block using the SN in the layer above the RLC layer; generating at least one protocol data unit (PDU) from the ciphered data block, wherein the generating the at least one PDU includes at least one of segmenting or concatenating the ciphered data block;
    assigning an ARQ SN to the at least one PDU; transmitting the at least one PDU to an evolved Node B (eNB);
    receiving, from an ARQ function in the eNB, a negative acknowledgment (NACK);
    transmitting an ARQ retransmission of the at least one PDU to the eNB;
    re-segmenting one of the ciphered data block or the PDUs to multiple sub-level PDUs in smaller size than previous PDUs when transmission of at least one previous PDU fails;
    including a segmentation identifier; and
    retransmitting the multiple PDUs.

2. The method of claim 1 wherein the generic SN is derived from a seed.

3. The method of claim 2 wherein the seed is a required transmission sequence number known at the WTRU.

4. The method of claim 3 wherein the required transmission sequence number is one of a packet data convergence protocol (PDCP) sequence number, a radio resource control (RRC) message sequence number and a non-access stratum (NAS) message sequence number.

5. The method of claim 1 wherein the generic SN is assigned by a higher layer entity.

6. The method of claim 1 wherein the generic SN is attached only to a first PDU.

7. The method of claim 1 wherein a segment header is attached to each of the PDUs.

8. The method of claim 1 wherein a segment header is attached only to a PDU which includes padding.

9. The method of claim 1 further comprising:
terminating a hybrid automatic repeat request (H-ARQ) process for the previous PDUs.

10. The method of claim 1 further comprising:
retransmitting a failed PDU when transmission of at least one previous PDU fails.

11. The method of claim 1 wherein multiple ciphered data blocks are concatenated to one PDU.

12. The method of claim 11 wherein a segment header is attached to the PDU.

13. The method of claim 11 wherein a segment header is attached only if the PDU includes padding.

14. The method of claim 11 further comprising:
separating the PDU to multiple sub-PDUs when transmission of the PDU fails, each sub-PDU including at least one data block; and
retransmitting the sub-PDUs.

15. The method of claim 1 wherein one PDU is generated from one ciphered data block.

16. The method of claim 15 wherein an ARQ SN is embedded in the generic SN.

17. The method of claim 15 wherein a size of the data block is fixed.

18. The method of claim 15 wherein a size of the data block is flexible.

19. The method of claim 15 further comprising:
segmenting one of the ciphered data block or the PDU to multiple sub-level PDUs when transmission of the PDU fails;
incrementing a segmentation version identifier; and
retransmitting the multiple PDUs.

20. The method of claim 19 further comprising:
terminating a hybrid automatic repeat request (H-ARQ) process for the previous PDU.

21. A wireless transmit/receive unit (WTRU) for implementing data security and automatic repeat request (ARQ), the WTRU comprising:
a cipher entity configured to assign a generic sequence number (SN) to a data block in a layer above a radio link control (RLC) layer;
the cipher entity configured to cipher an uplink data block for transmission and decipher a ciphered downlink data block using the generic SN in the layer above the RLC layer; and
an automatic repeat request (ARQ) entity configured to perform an ARQ operation for transmission of the ciphered uplink data block and reception of the downlink data block,
wherein ARQ retransmissions of the uplink data block use the ARQ SN and are performed with an ARQ function located at an eNB;
wherein the ARQ entity is configured to segment one of the uplink data block and the PDUs to multiple sub-level PDUs in smaller size than previous PDUs when transmission of at least one previous PDU fails, and configured to include a segmentation identifier.

22. The WTRU of claim 21 wherein the cipher entity derives the generic SN from a seed.

23. The WTRU of claim 22 wherein the seed is a required transmission sequence number known at the WTRU.

24. The WTRU of claim 23 wherein the required transmission sequence number is one of a packet data convergence protocol (PDCP) sequence number, a radio resource control (RRC) message sequence number and a non-access stratum (NAS) message sequence number.

25. The WTRU of claim 21 wherein the generic SN is assigned by a higher layer entity.

26. The WTRU of claim 25 wherein the higher layer entity is one of a radio resource control (RRC) entity, a non access stratum (NAS) entity, and a packet data convergence protocol (PDCP) entity.

27. The WTRU of claim 21 wherein the ARQ entity assigns an ARQ SN to each of the PDUs.

28. The WTRU of claim 21 wherein the ARQ entity attaches the generic SN only to a first PDU.

29. The WTRU of claim 21 wherein the ARQ entity attaches a segment header to each of the PDUs.

30. The WTRU of claim 21 wherein the ARQ entity attaches a segment header only to a PDU which includes padding.

31. The WTRU of claim 21 wherein a hybrid automatic repeat request (H-ARQ) process for the previous PDUs is terminated.

32. The WTRU of claim 21 wherein the ARQ entity is configured to resend only a failed PDU.

33. The WTRU of claim 21 wherein the ARQ entity concatenates multiple ciphered uplink data blocks into one protocol data unit (PDU).

34. The WTRU of claim 33 wherein the ARQ entity attaches a segment header to the PDU.

35. The WTRU of claim 33 wherein the ARQ entity attaches a segment header only if the PDU includes padding.

36. The WTRU of claim 33 wherein the ARQ entity is configured to separate the PDU to multiple sub-PDUs when transmission of the PDU fails, each sub-PDU including at least one ciphered uplink data block.

37. The WTRU of claim 21 wherein the ARQ entity generates one protocol data unit (PDU) from one ciphered uplink data block.

38. The WTRU of claim 37 wherein an ARQ SN is embedded in the generic SN.

39. The WTRU of claim 38 wherein a size of the uplink data block is fixed.

40. The WTRU of claim 38 wherein a size of the uplink data block is flexible.

41. The WTRU of claim 37 wherein the ARQ entity is configured to segment one of the ciphered uplink data block or the PDU to multiple sub-level PDUs when transmission of the PDU fails, and increase a segmentation version identifier.

42. The WTRU of claim 41 wherein a hybrid automatic repeat request (H-ARQ) process for the previous PDU is terminated.

* * * * *

UNITED STATES PATENT AND TRADEMARK OFFICE
CERTIFICATE OF CORRECTION

PATENT NO. : 8,155,053 B2  
APPLICATION NO. : 11/612139  
DATED : April 10, 2012  
INVENTOR(S) : Wang et al.

Page 1 of 2

It is certified that error appears in the above-identified patent and that said Letters Patent is hereby corrected as shown below:

ON THE TITLE PAGE

Item (56) U.S. PATENT DOCUMENTS, page 1, right column, before "2003/0091048 A1* 5/2003 Jiang 370/392", insert:

--5,590,133 12/1996 Billstrom et al.
5,784,362 07/1998 Turina
5,809,148 11/1998 Doberstein et al.
6,487,184 11/2002 Pecen et al.
6,826,168 11/2004 Galyas et al.
7,197,145 03/2007 Yi
7,233,671 06/2007 Wu
2002/0044552 04/2002 Vialen et al.
2003/0036399 02/2003 Casaccia et al.--.

Item (56) FOREIGN PATENT DOCUMENTS, page 1, right column, after "2003/0157927 A1* 8/2003 Yi et al. 455/411", insert:

--1 487 161 12/2004 EP
1 569 408 08/2005 EP
2002-135231 05/2002 JP
2138126 09/1999 RU
2152134 06/2000 RU
97/44934 11/1997 WO
01/45443 06/2001 WO
05/041461 05/2005 WO
05/120121 12/2005 WO--.

Signed and Sealed this  
Twenty-fourth Day of December, 2013

Margaret A. Focarino  
*Commissioner for Patents of the United States Patent and Trademark Office*

CERTIFICATE OF CORRECTION (continued)
U.S. Pat. No. 8,155,053 B2

Item (56) OTHER PUBLICATIONS, page 1, right column, after "Mobile Internet (pp. 356, 358).*", insert:

--3GPP, 3rd Generation Partnership Project; Technical Specification Group Radio Access Network; Evolved Universal Terrestrial Radio Access (UTRA) And Universal Terrestrial Radio Access Network (UTRAN); Radio Interface Protocol Aspects (Release 7), 3GPP TR 25.813 V0.1.0 (2005-11), (November 2005).

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release x8), 3GPP TS 36.300 V0.123.0 1 (November 2006).

ERICSSON, Proposed CR to 25.322 on introduction of RLC suspend state, 3GPP/SMG Meeting #9, R2-99K57 (November 29 – December 3, 1999).

NOKIA ET AL., Joint Proposal On U-Plane Architecture Option A, Joint RAN WG2 #49 and RAN WG3 #49 mtg on LTE, R2-052920, (Seoul, Korea 7-11 November 2005).

QUALCOMM EUROPE, Qualcomm proposal for E-UTRAN Architecture and Protocols, 3GPP TSG-RAN2 Meeting #49, R2-052921 (November 7-11, 2005).

QUALCOMM EUROPE, Qualcomm proposal for E-UTRAN Architecture and Protocols, 3GPP TSG-RAN2 Meeting #49, R2-052897 (November 7-11, 2005).

SEURRE ET AL., "GPRS for Mobile Internet," Mobile Communications Series, pp. 356, 358 (2003).

SIEMENS, ARQ-HARQ, 3GPP TSG-RAN WG RAN2 #49, R2-052918 (November 7-11, 2005).--.

IN THE SPECIFICATION

At column 1, line 46, after "RLC protocol", delete "packet".